US012646964B2

(12) United States Patent
Jung et al.

(10) Patent No.: US 12,646,964 B2
(45) Date of Patent: Jun. 2, 2026

(54) SEMICONDUCTOR PRE-CHARGER MODULE IN BATTERY SYSTEM

(71) Applicant: ELECTRONICS AND TELECOMMUNICATIONS RESEARCH INSTITUTE, Daejeon (KR)

(72) Inventors: Dong Yun Jung, Daejeon (KR); Kun Sik Park, Daejeon (KR); Jong Il Won, Daejeon (KR); Hyun-Gyu Jang, Daejeon (KR); Doohyung Cho, Daejeon (KR); Jong-Won Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 814 days.

(21) Appl. No.: 18/153,155

(22) Filed: Jan. 11, 2023

(65) Prior Publication Data

US 2023/0231404 A1 Jul. 20, 2023

(30) Foreign Application Priority Data

Jan. 18, 2022 (KR) ........................ 10-2022-0007325
Nov. 15, 2022 (KR) ........................ 10-2022-0152343

(51) Int. Cl.
*H02J 7/00* (2026.01)
*H02J 7/80* (2026.01)
(Continued)

(52) U.S. Cl.
CPC ...... *H02J 7/96* (2026.01); *H02J 7/80* (2026.01); *H02J 7/927* (2026.01); *H02J 7/94* (2026.01); *H02J 2207/20* (2020.01)

(58) Field of Classification Search
USPC ........................................................ 320/162
See application file for complete search history.

(56) References Cited

U.S. PATENT DOCUMENTS 9,883,258 B2    1/2018 Yun et al.
11,347,772 B2 *  5/2022 Chatrain ............. G06F 16/2365
(Continued)

FOREIGN PATENT DOCUMENTS

CN       215154067 U    12/2021
DE     102014202504 A1   8/2015
(Continued)

OTHER PUBLICATIONS

DE102014202504 (Year: 2014).*
(Continued)

*Primary Examiner* — Samuel Berhanu
(74) *Attorney, Agent, or Firm* — Rabin & Berdo, P.C.

(57) ABSTRACT

There is provided a battery system including: a main switch configured to supply or cut off a voltage of a battery to a load; a semiconductor pre-charger module which includes a semiconductor switch configured to supply or cut off the voltage of the battery to the load, and a semiconductor switch driver configured to output a pulse signal for driving the semiconductor switch to turn on and off the semiconductor switch, and is connected in parallel with the main switch; and a controller configured to generate a control signal for controlling the main switch and the semiconductor pre-charger module, wherein the semiconductor switch driver of the semiconductor pre-charger module includes an isolation element configured to electrically isolate the controller and the voltage of the battery. Here, the semiconductor switch of the semiconductor pre-charger module may be a metal-oxide-semiconductor (MOS)-controlled thyristor (MCT).

14 Claims, 6 Drawing Sheets

(51) Int. Cl.

| | | |
|---|---|---|
| *H02J 7/90* | (2026.01) | |
| *H02J 7/94* | (2026.01) | |
| *H02J 7/96* | (2026.01) | |

(56) References Cited

U.S. PATENT DOCUMENTS

| | | | | |
|---|---|---|---|---|
| 2012/0056595 A1* | 3/2012 | Kumagai | .............. | H02J 7/0031 |
| | | | | 327/419 |
| 2012/0086390 A1* | 4/2012 | Lim | ...................... | H02J 7/0019 |
| | | | | 320/134 |
| 2015/0251542 A1 | 9/2015 | Mensah-Brown et al. | | |
| 2015/0372477 A1 | 12/2015 | Mo et al. | | |
| 2016/0172889 A1 | 6/2016 | Kim et al. | | |
| 2019/0288504 A1 | 9/2019 | Götz | | |
| 2020/0274385 A1* | 8/2020 | Saito | ...................... | H02M 1/36 |

FOREIGN PATENT DOCUMENTS

| | | |
|---|---|---|
| EP | 2426806 A2 | 3/2012 |
| JP | S5363855 A | 6/1978 |
| JP | S63220762 A | 9/1988 |
| JP | H0268958 A | 3/1990 |
| JP | 2006220762 A | 8/2006 |
| JP | 2006262586 A | 9/2006 |
| JP | 2011211761 A | 10/2011 |
| JP | 2018128433 A | 8/2018 |
| JP | 2020137334 A | 8/2020 |
| JP | 2021044971 A | 3/2021 |
| KR | 20110109800 A | 10/2011 |
| KR | 10-1521984 B1 | 5/2015 |
| KR | 10-2080635 B1 | 2/2020 |
| KR | 10-2020-0075095 A | 6/2020 |
| KR | 10-2021-0047142 A | 4/2021 |

OTHER PUBLICATIONS

Victor A. K. Temple, "MOS-Controlled Thyristors—A New Class of Power Devices", IEEE Transactions on Electron Devices, vol. ED-33, No. 10, Oct. 1986.

* cited by examiner

COMPUTER SYSTEM

SEMICONDUCTOR PRE-CHARGER MODULE IN BATTERY SYSTEM

CROSS-REFERENCE TO RELATED APPLICATION

This application claims priority to and the benefit of Korean Patent Applications No. 10-2022-0007325 filed on Jan. 18, 2022 and No. 10-2022-0152343 filed on Nov. 15, 2022, the disclosures of which are incorporated herein by reference in their entirety.

BACKGROUND

1. Field of the Invention

The present invention relates to a battery system, and more specifically, to a semiconductor pre-charger module for preventing damage to a system due to an in-rush current when the system starts in various devices including an electric vehicle and the like using batteries and achieving high reliability, a small size, a light weight, and high efficiency of the system, and a battery system including the same.

2. Discussion of Related Art

FIG. 1 is a schematic circuit diagram of a conventional battery system, and illustrates a system for driving a motor M of an electric vehicle as an example. When a voltage of a battery is directly connected to a line capacitor $C_L$ through a main switch Switch1 when the battery system starts (that is, when vehicle ignition is turned on), an in-rush current flows due to a voltage difference between the battery and the capacitor $C_L$ and thus damages the system. In order to prevent this, in general, a path which connects a pre-charge switch Switch2 and a pre-charge resistor $R_P$ in series is connected in parallel to the switch Switch1, and is referred to as a pre-charge path. The switch Switch2 is turned on until the voltage difference between the battery and the capacitor $C_L$ reaches a predetermined level to cause a current to flow through the pre-charge path, and then the switch Switch1 is turned on and the switch Switch2 is turned off again to drive a motor through an inverter, thereby promoting stability of the system and minimizing power loss.

Generally, relays having excellent high voltage and high current performance are used as the switches Switch1 and Switch2. However, since the relays are a mechanical contact type, when contact between two different metals of the relays occurs (i.e., short-circuited), vibration and heat are generated between the two metals, high temperature heat is generated when used for a long time, the short-circuit occurs due to melting of the metals caused by the vibration together with the heat, and thus generally a lifespan is shorter, a weight is heavier, and a volume is larger. Further, it is very important for the pre-charge switch to operate safely for a short time of hundreds of psec according to a system specification, but the relay has a disadvantage in that a turn-on time is as long as several msec.

Recently, in order to solve issues of relays, research has been conducted to replace a conventionally used relay with a silicon metal-oxide-semiconductor field-effect transistor (Si-MOSFET), a silicon carbide MOSFET (SiC-MOSFET) or an insulated gate bipolar transistor (IGBT).

SUMMARY OF THE INVENTION

The present invention is directed to providing a semiconductor-based pre-charger module which has a small leakage current and a low gate turn-on voltage, and may be driven with a single pulse in a battery system to achieve high reliability, a small size, a light weight, and high efficiency of the battery system.

In order to solve the above problems, in the present invention, a semiconductor pre-charger module of high reliability, a small size, a light weight, and high efficiency using an MCT (metal-oxide-semiconductor controlled thyristor), and a battery system to which the semiconductor pre-charger module is applied are provided to overcome a problem of existing relays which have been used as pre-charger switches and recently raised problems of MOSFET and IGBT.

Specifically, according to an aspect of the present invention, there is provided a battery system including: a main switch configured to supply or cut off a voltage of a battery to a load; a semiconductor pre-charger module which includes a semiconductor switch configured to supply or cut off the voltage of the battery to the load, and a semiconductor switch driver configured to output a pulse signal for driving the semiconductor switch to turn on and off the semiconductor switch, and is connected in parallel with the main switch; and a controller configured to generate a control signal for controlling the main switch and the semiconductor pre-charger module, wherein the semiconductor switch driver of the semiconductor pre-charger module includes an isolation element configured to electrically isolate the controller and the voltage of the battery. Here, the semiconductor switch of the semiconductor pre-charger module may be a metal-oxide-semiconductor (MOS)-controlled thyristor (MCT).

Further, according to another aspect of the present invention, there is provided a semiconductor pre-charger module including: a semiconductor switch configured to supply or cut off a voltage of a battery to a load according to an external control signal; and a semiconductor switch driver configured to output a pulse signal for driving the semiconductor switch to turn on and off the semiconductor switch, wherein the semiconductor switch driver includes an isolation element configured to electrically isolate the external control signal and the voltage of the battery, and the semiconductor switch is connected in parallel with a main switch capable of supplying the voltage to the load. Here, the semiconductor switch may be a metal-oxide-semiconductor (MOS)-controlled thyristor (MCT). The MCT means a thyristor having a MOS gate, which is also called as a MOS-gated thyristor (MGT), a base-resistance controlled thyristor (BRT), an emitter switched thyristor (EST), an emitter turn-off thyristor (ETO), or the like.

Configurations and actions of the present invention will become more apparent through specific embodiments described later in conjunction with the drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, preferable embodiments of the present invention will be described in detail with reference to the accompanying drawings. Hereinafter, terms used in the description are provided not to limit the present invention but to describe the embodiments. In the embodiments, singular forms are intended to also include plural forms unless the context clearly indicates otherwise. The terms "comprise" and/or "comprising" as used herein are used in the sense of not precluding the presence or addition of at least one other component, step, operation, and/or element other than the stated components, steps, operations and/or elements.

As mentioned above, a battery system proposed by the present invention includes a semiconductor pre-charger module of high reliability, a small size, a light weight, and high efficiency using an MCT (MOS (metal-oxide-semiconductor) controlled thyristorT) to overcome a problem of existing relays which have been used as pre-charger switches and recently raised problems of a metal-oxide-semiconductor field-effect transistor (MOSFET) and an insulated gate bipolar transistor (IGBT).

Before describing an embodiment of the battery system proposed in the present invention, IGBT, MOSFET, and MCT used in the present invention will be introduced simply.

Figure 1:
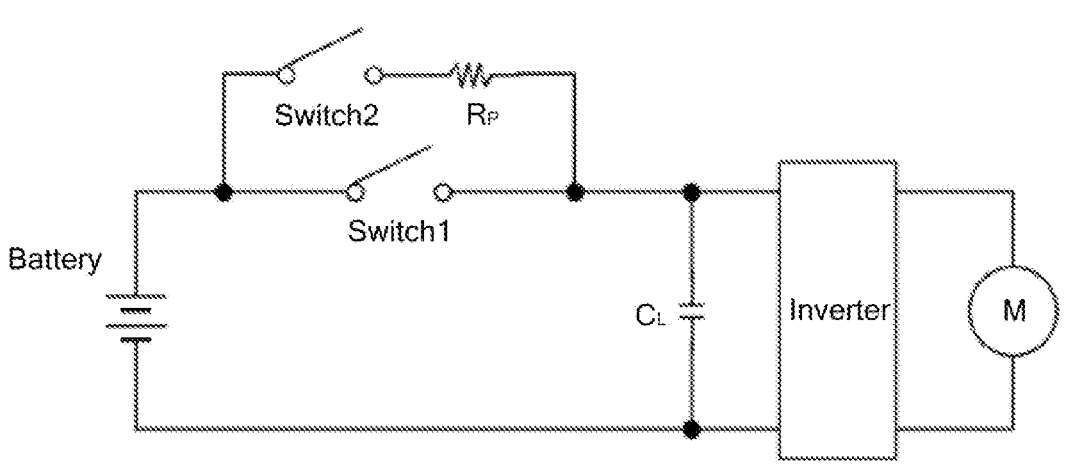
FIG. 1 is a configuration diagram of a general battery system.
Figure 2:
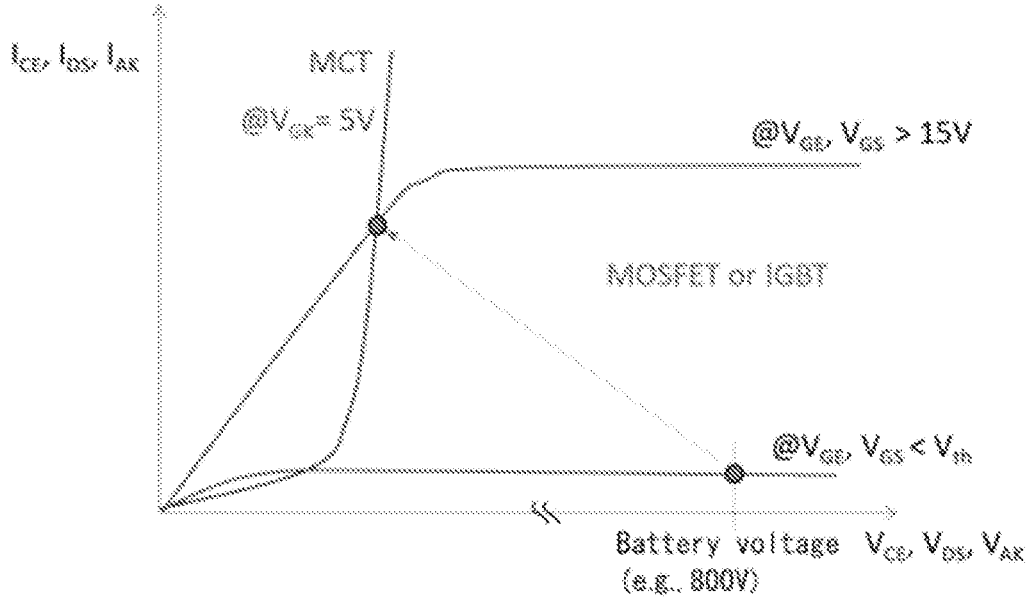
FIG. 2 illustrates a current-voltage curve of a semiconductor.

Si-MOSFET generally has a breakdown voltage of 650 V and thus can be applied to a hybrid vehicle having a battery of 400 V or less, but cannot be used in a high-voltage battery system of 400 V or more including an electric vehicle of which a battery voltage has recently increased up to around 800 V. There is a problem in that: although IGBT has a breakdown voltage characteristic of 1200 V or more, as a large leakage current of several tens of μA or more is generated even when the gate of IGBT is turned off at 0 V, but the battery continuously discharges even when the system is turned off. SiC-MOSFET has a breakdown voltage characteristic of 1200 V or more and has a leakage current characteristic of a level of several μA which is relatively low compared to the IGBT. Further, the IGBT and the SiC-MOSFET require a high gate voltage of approximately 15 V or more for a normal operation. In addition, as shown in FIG. 2, in the case of the IGBT or the MOSFET, even when a collector-emitter voltage $V_{CE}$ or a drain-source voltage $V_{DS}$ increases, the current does not increase within a predetermined region. Specifically, since a threshold voltage $V_{th}$ for the normal operation is approximately 3 to 6 V, it may be fatal when very large power is applied to the device until the threshold voltage or more is supplied to. On the other hand, there are advantages in that MCT to be used in the present invention exhibits an operation characteristic similar to that of a diode, and thus large power is not applied to the element, and an operation voltage across gate and cathode $V_{GK}$ is 5 V or less which is lower than other semiconductor devices, and therefore a driving circuit therefor may become simplified.

Figure 3:
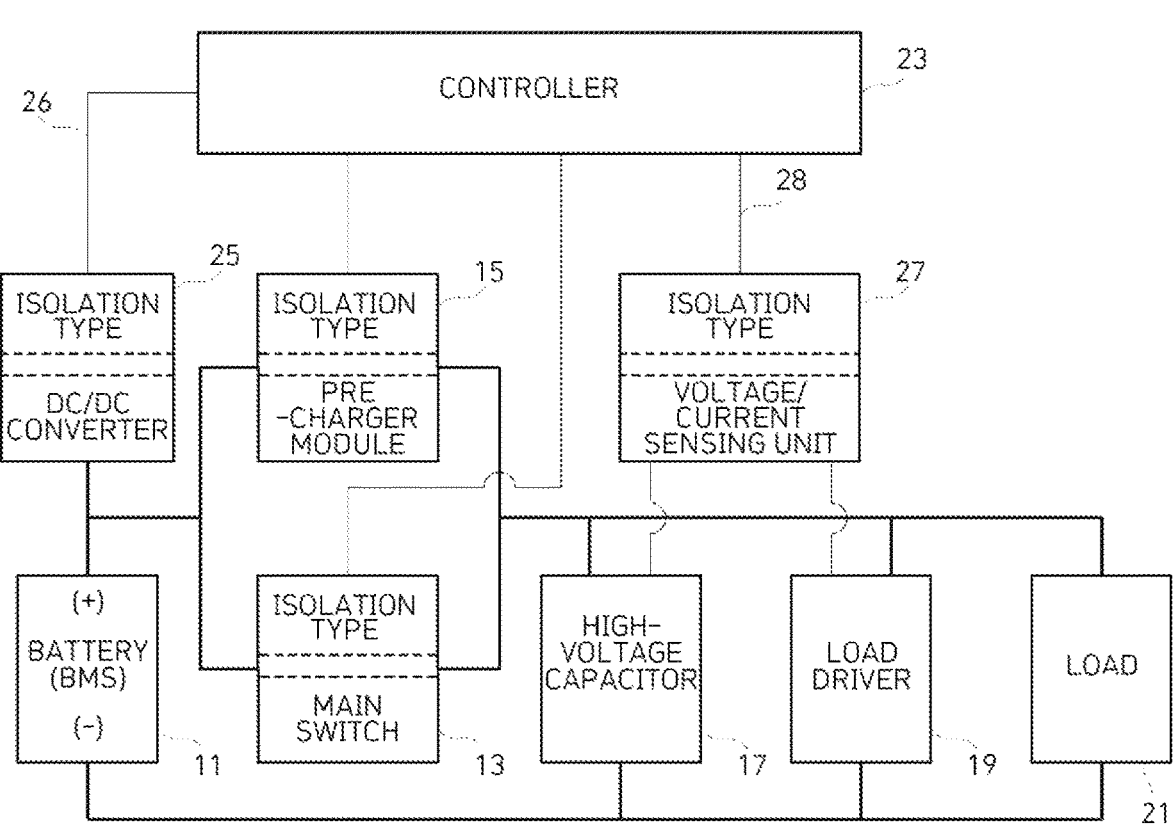
FIG. 3 illustrates a battery system of the present invention.

Now, a battery system according to the present invention will be specifically described. FIG. 3 illustrates a block diagram of the battery system according to the present invention.

A battery 11 including a battery management system (BMS) is connected to a high-voltage capacitor 17, a load driver 19, and a load 21 through an isolation-type main switch 13 and an isolation-type semiconductor pre-charger module 15. A relatively high voltage is applied to both ends of these blocks, as indicated with thick lines in FIG. 3. A controller 23 receives a lower voltage 26 acquired by lowering a higher voltage of the battery through an isolation-type DC/DC converter 25 to drive and control the isolation-type semiconductor pre-charger module 15, the isolation-type main switch 13, and an isolation-type voltage/current sensing unit 27. Here, the term "isolation-type" used in the isolation-type main switch 13, the isolation-type semiconductor pre-charger module 15, the isolation-type DC/DC converter 25, and the isolation-type voltage/current sensing unit 27 means that a battery having relatively high voltage and control or driving signals having relatively low voltage are electrically isolated.

Values of voltage and a current 28 sensed by the voltage/current sensing unit 27 are input to the controller 23 and used to diagnose a failure of the battery system. As mentioned above, the DC/DC converter 25, the main switch 13, the semiconductor pre-charger module 15, and the voltage/current sensing unit 27 remain isolated from a higher voltage path (depicted in thick line) of the battery 11. The semiconductor pre-charger module 15 is connected in parallel with the main switch 13, and as shown in the configuration in FIG. 3 it may be present only at a (+) pole of the battery, may be present only at a (−) pole of the battery, or may be present at both the (+) and (−) poles of the battery, depending on the system design.

In the present invention, a pre-charge semiconductor switching device used in the semiconductor pre-charger module 15 is a MOS-controlled thyristor (MCT) having a breakdown voltage of 1000 V or more and a low leakage current characteristic of a level of nA.

Figure 4:
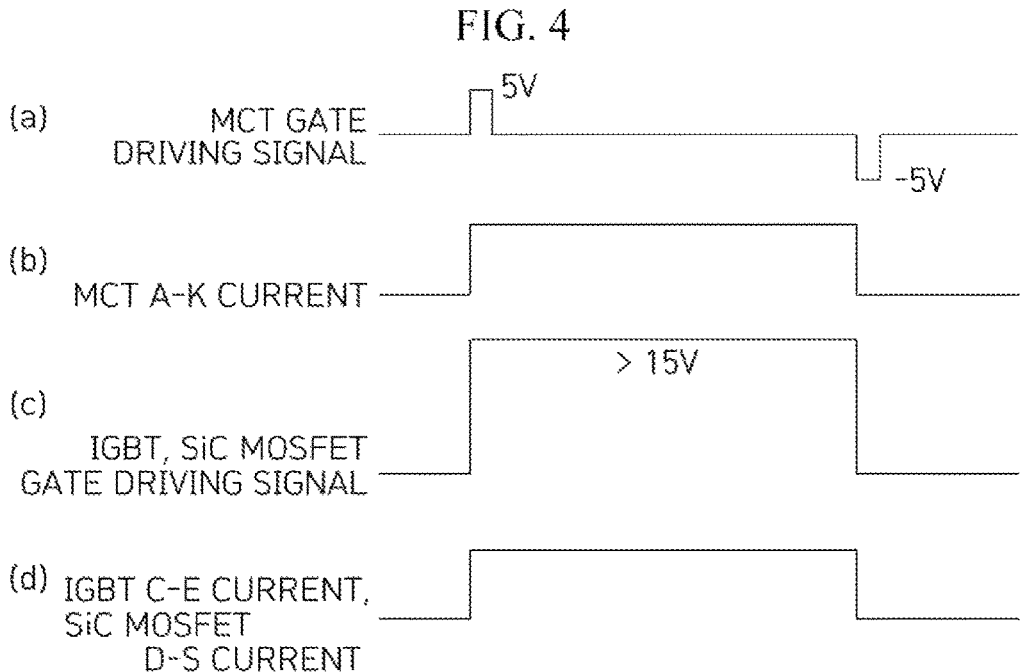
FIG. 4 illustrates an example of a pre-charge semiconductor switch gate driving signal and a current.

A relationship between a gate driving signal and an MCT current in driving a gate of the MCT switch is shown in FIG. 4. Although in IGBT or SiC-MOSFET, when a driving signal of 15 V or more must be applied to a gate for a long time (c), a current flows between a collector C and an emitter E or a drain D and a source S (d), in MCT, when a driving signal of only a single pulse of 5 V is applied to a gate (a), a current flows between an anode A and a cathode K (b). A cycle of the single pulse signal of MCT driving signal may be a unit of psec.

In order to apply the driving signal to the gate of the MCT which operates with a single pulse of a low voltage, the driving signal should be isolated from a relatively high voltage path of the battery. To this end, a single-pulse isolated drive circuit should be constructed. Specifically, in a semiconductor switch driver of the semiconductor pre-charger module of the present invention, since the MCT has a very small leakage current of an nA level and a gate operation voltage of 5 V which is lower than that of another MOSFET or IGBT, the circuit of the semiconductor switch driver may become greatly simplified.

Figure 5:
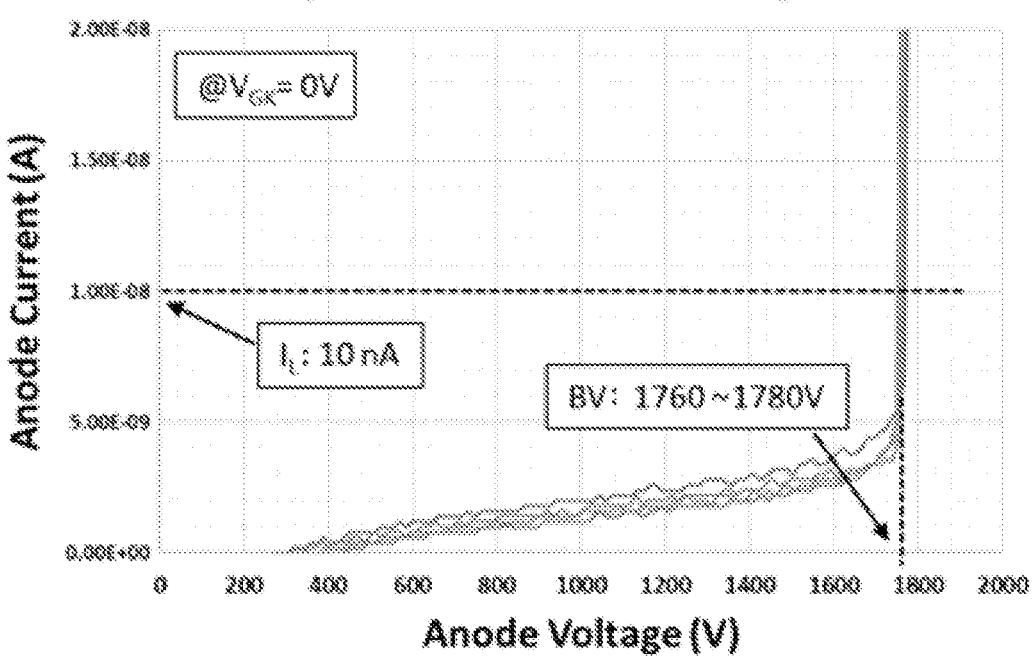
FIG. 5 illustrates characteristics of a leakage current and a breakdown voltage of an MCT (MOS-controlled thyristor)

FIG. 5 is a characteristic graph of a leakage current IL and a breakdown voltage BV of an MCT developed by the Korea Electronics and Telecommunications Research Institute. When a voltage $V_{GK}$ between a gate G and a cathode K of the MCT is 0 V, the leakage current IL flowing between an anode A and the cathode K of the MCT is 5 nA or less, and the breakdown voltage BV is 1760 V or more.

Figure 6:
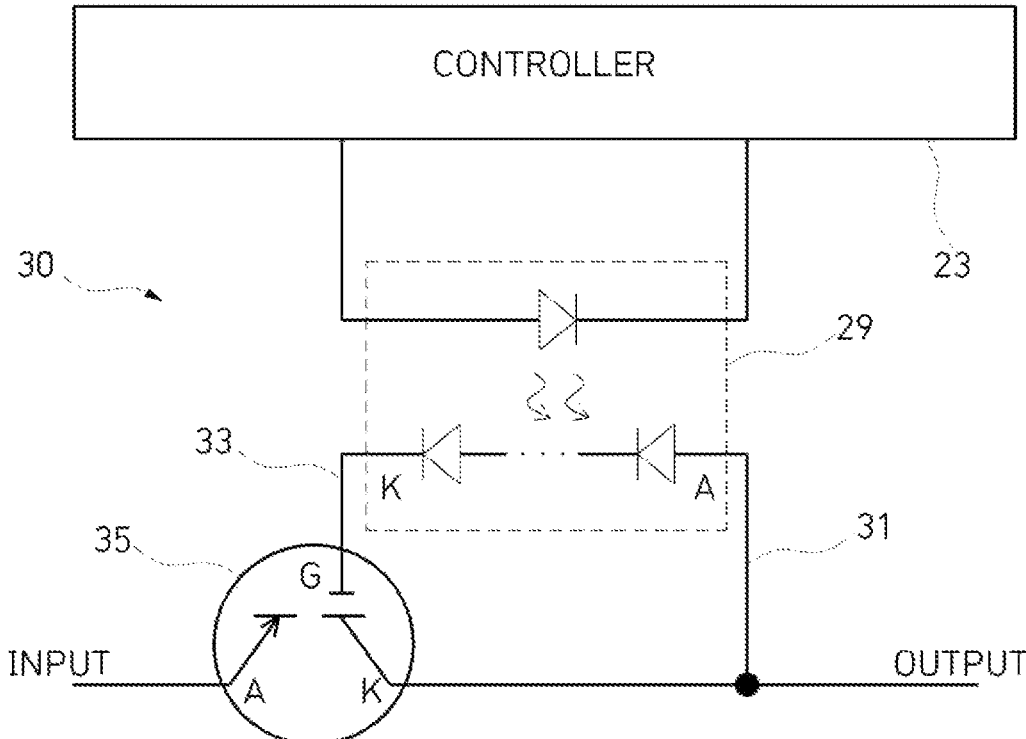
FIG. 6 illustrates an example of a circuit using an opto-coupler to isolate the MCT.
Figure 7:
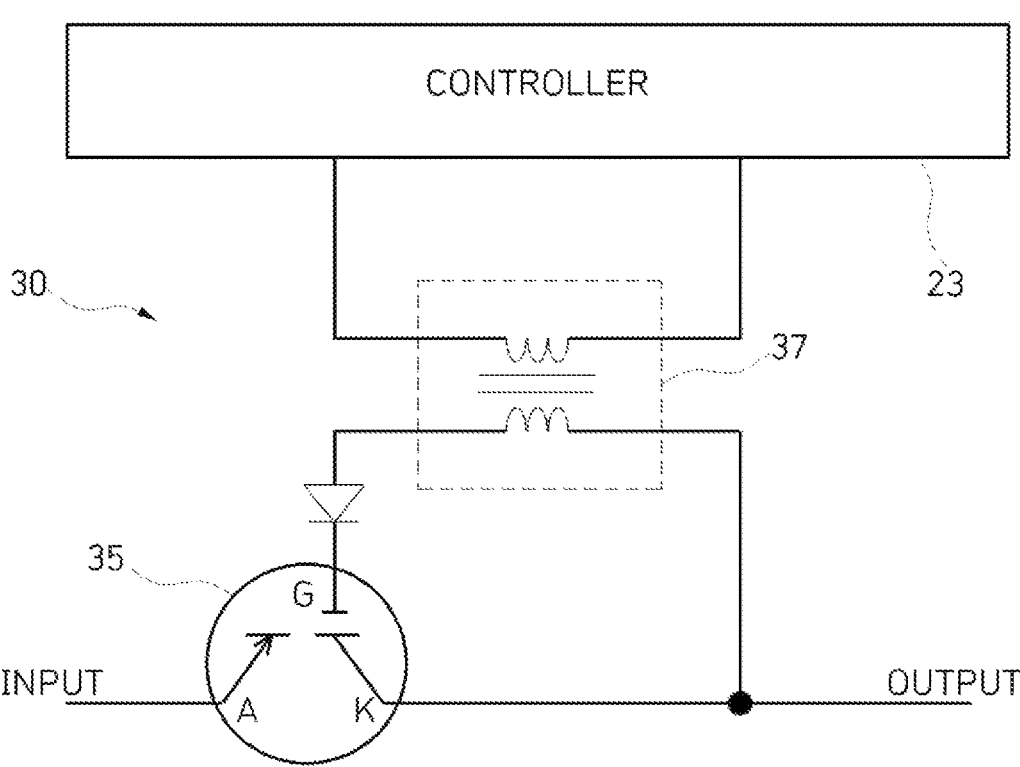
FIG. 7 illustrates an example of a circuit using a transformer to isolate and drive the MCT.

Referring to FIGS. 6 and 7, the semiconductor pre-charger module 15 is composed of a semiconductor switch 35 which supplies and cuts off the voltage of the battery 11 to the load 21, and a semiconductor switch driver 30 which receives the drive or control signal output from the controller 23 to turn-on or turn-off the semiconductor switch 35.

As mentioned above, the semiconductor switch driver 30 constituting the semiconductor pre-charger module 15 should include an isolation element which isolates a control-related unit (for example, the controller 23) from a high voltage unit (for example, a battery voltage path).

A semiconductor switch driver 30 using an optocoupler (also called optoisolator or photovoltaic) 29 is shown in FIG. 6 as an example of the isolation element. In the circuit of FIG. 6, a light-emitting unit of the optocoupler 29 is connected to the controller 23 to blink according to the control signal, an anode output terminal 31 of a light-receiving unit electrically isolated from the light-emitting unit to receive an optical signal is connected to a cathode of an MCT 35, and a cathode output terminal 33 is connected to a gate of the MCT 35. Generally, since the optocoupler has a small output current of a level of several tens of µA, a long time for driving SiC-MOSFET or IGBT which requires a gate voltage of 15 V or more is demanded, and since there is a time in which a current flows in a state in which a high voltage is applied across a drain and a source or across an emitter and a collector, SiC-MOSFET or IGBT cannot withstand high energy and be destroyed. However, in the case of the MCT, since a leakage current of a level of nA and a gate voltage of 5 V are required, a low voltage is applied across the anode and cathode, and a large current flows at the same time at a voltage greater than a threshold voltage, high energy is not applied to it and thus there is no concern of destruction. Further, there is an advantage in that the semiconductor switch driver may be simplified, and thus the system may be miniaturized and lightened.

In addition, the pre-charge switch should operate for hundreds of msec, and when the MOSFET or the IGBT is used as the pre-charge switch, a voltage of 15 V or more must be applied to the gate for several hundred msec, on the other hand, in the MCT, the current starts to flow when a single pulse signal of 5 V is applied to the gate, and the current is maintained even when a voltage is not applied until the single pulse signal of –5 V is applied to the gate.

The advantage of the MCT also becomes a great advantage in design of the semiconductor pre-charger module 15 using the isolation element as a transformer 37 as shown in FIG. 7. In FIG. 7, a primary side and a secondary side of the transformer 37 are electrically isolated and signal transmission is performed by an electromagnetic induction action. Since a turn-on time of a signal which may be transmitted by the transformer is generally tens of psec, in order to maintain a gate voltage for hundreds of msec when MOSFET or IGBT is driven, a plurality of pulse signals must be transmitted and rectified to be used. However, in the case the MCT which operates with a single pulse is used, since a rectifier circuit is not required, a circuit of the semiconductor switch driver 30 is simplified as shown in FIG. 7, and thus the system may be miniaturized and lightened.

Figure 8:
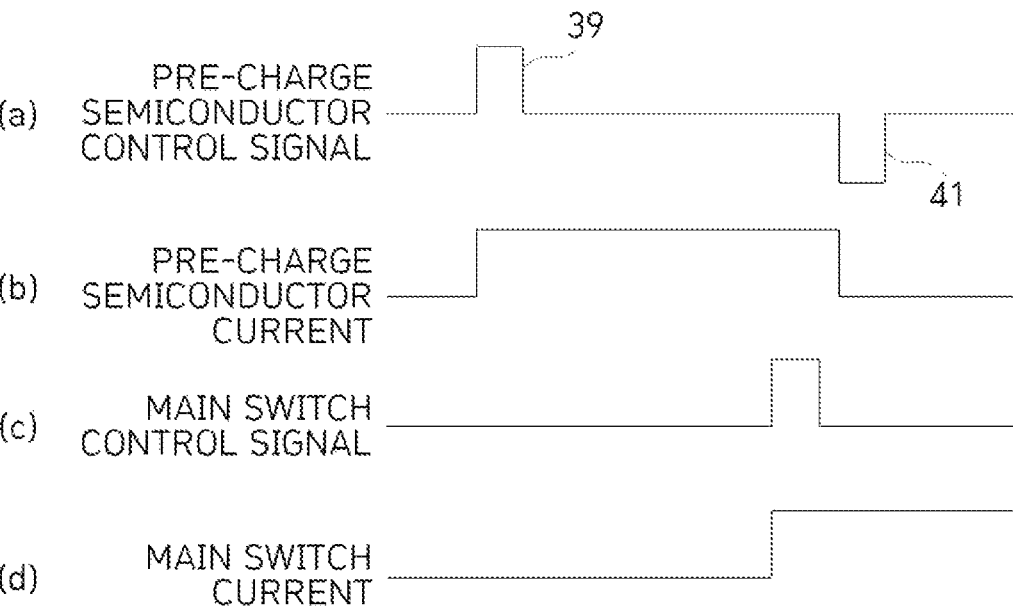
FIG. 8 illustrates an operation timing of the semiconductor pre-charger module.

FIG. 8 illustrates an example of an operation timing of the main switch 13 and the semiconductor pre-charger module 15 of the present invention. When the control signal is applied to the pre-charge semiconductor switch 35 (*a*), the semiconductor switch continues an operation for hundreds of msec (*b*). In this case, turn-on and turn-off of the semiconductor switch 35 are controlled by single pulses 39 and 41 of the control signal from the semiconductor switch driver 30. The main switch control signal is applied to the main switch 13 from the controller 23 just before (approximately at the same time) the pre-charge semiconductor switch, that is, the MCT 35, is turned off (*c*), and then the current flows in the main switch 13 and thus the operation of the battery system is maintained (*d*). This timing will be additionally described below with reference to FIG. 9.

Figure 9:
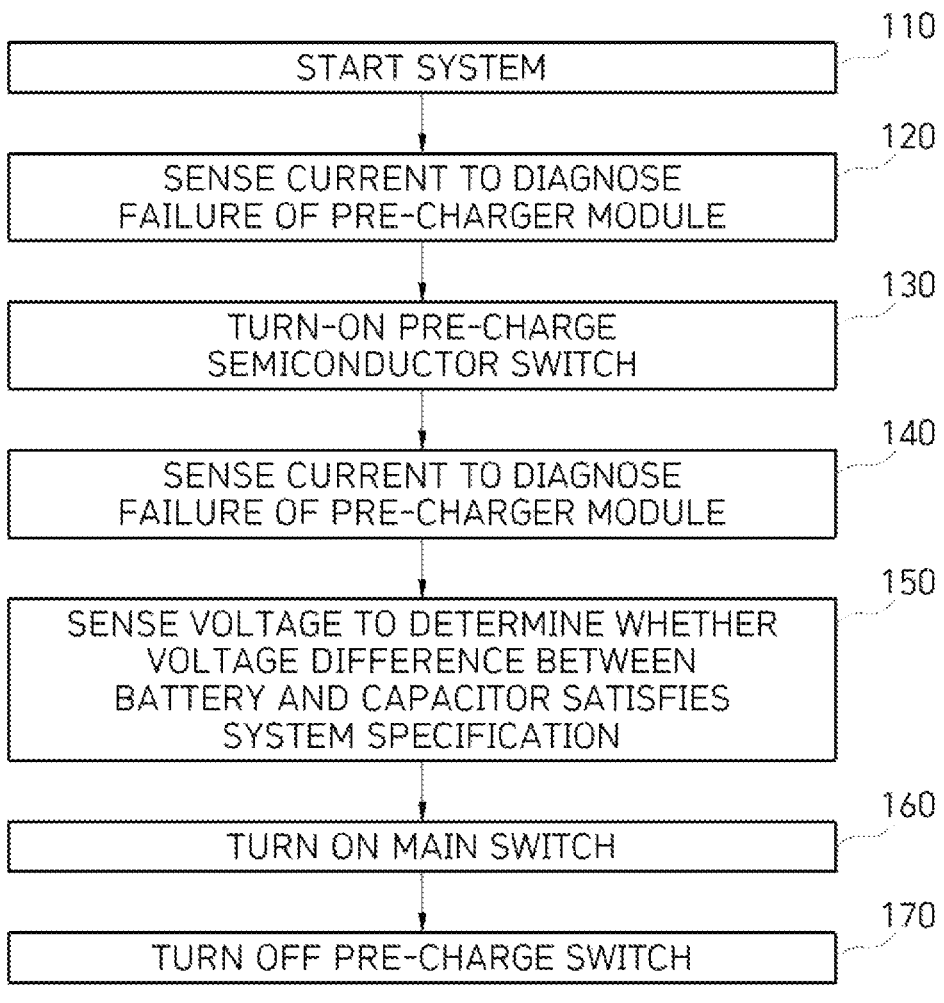
FIG. 9 illustrates a method of controlling the semiconductor pre-charger module.

FIG. 9 illustrates a method of controlling the semiconductor pre-charger module of the present invention. When the system starts (110) (for example, vehicle ignition is turned on), a current is sensed to diagnose a failure of the semiconductor pre-charger module (120). If the pre-charge semiconductor or a pre-charge resistor is short-circuited, the current flows, which tells fail status. After checking that current does not flow, the pre-charge semiconductor switch is turned on (130). When the semiconductor pre-charger module is turned on, the current is sensed again to check whether the current flows through the semiconductor pre-charger module to check whether the semiconductor pre-charger module is failed (140). Once it is confirmed that the semiconductor pre-charger module is not failed, a voltage difference between the battery and a capacitor is measured to find it satisfies a system specification (150). Satisfying a system specification, the main switch is turned on (160), and then the pre-charge switch, that is, the semiconductor pre-charger module, is turned off (170).

Figure 10:
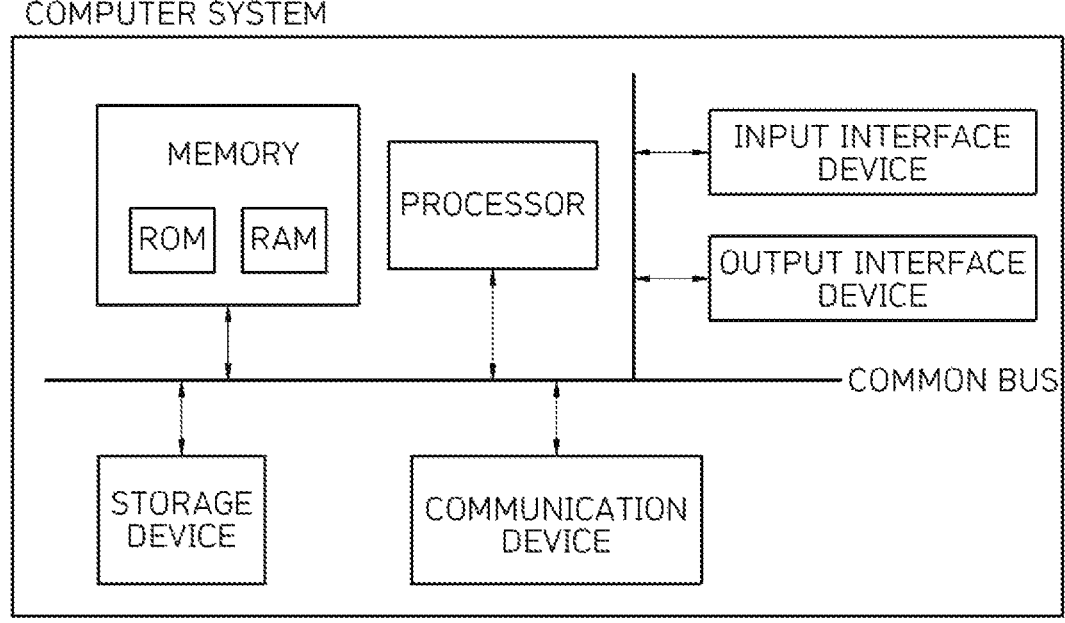
FIG. 10 is a block diagram of a computer system usable for implementing a controller.

The above-described controller 23 and the control process shown in FIGS. 8 and 9 may be implemented by a computer and a software program. FIG. 10 illustrates a block diagram of a computer system usable for this.

The computer system shown in FIG. 10 may include at least one of a processor, a memory, an input interface device, an output interface device, and a storage device which communicates through a common bus. The computer system may also include a communication device connected to a network. The processor may be a central processing unit (CPU) or may be a semiconductor device which executes instructions stored in the memory or the storage device. The communication device may transmit or receive a wired signal or a wireless signal. The memory or the storage device may include various types of volatile or non-volatile storage media. Further, the memory may include a read only memory (ROM) and a random access memory (RAM). The memory may be located at the inside or the outside of the processor, and may be connected to the processor through various known means.

Accordingly, the present invention may be implemented in a method realized in the computer or may be implemented as a non-transitory computer-readable medium in which computer-executable instructions are stored. In one embodiment, the computer readable instructions may perform a method according to at least one aspect described herein when executed by the processor.

Further, the method according to the present invention may be implemented in the form of program instructions which may be executed by various computer means to be recorded on a computer-readable medium. The computer readable medium may include program instructions, data files, data structures, and the like individually or in combination. The program instructions recorded on the computer readable medium may be specially designed and configured for the embodiments of the present invention, or may be known to be usable to those skilled in the art in the field of computer software. A computer-readable recording medium may include a hardware device configured to store and execute the program instructions. For example, computer-readable recording media include magnetic media such as a hard disk, a floppy disk, and a magnetic tape, optical media such as a compact disc (CD)-ROM and a digital versatile disc (DVD), magneto-optical media such as a floptical disk (magneto-optical media), a ROM, a RAM, a flash memory, and the like. The program instructions may include high-level language codes which may be executed by the computer through an interpreter or the like, as well as machine language codes generated by a compiler.

According to the present invention, since a problem of conventional relays of which a lifespan is shorter due to a mechanical contact type can be overcome and a driving circuit becomes simpler compared to a pre-charger to which the recently raised MOSFET or IGBT is applied, high reliability, a small size, a light weight, and high efficiency of a semiconductor pre-charger module can be achieved. The semiconductor pre-charger module of the present invention is a component essential to all devices including an electric vehicle and the like using a battery such as an energy storage device and the like, and thus a market size is very large and can be continuously expand in the future, and probability of commercialization is expected to be very high.

An embodiment that specifically realizes the spirit of the present invention has been described above. However, the technical scope of the present invention is not limited to the above-described embodiment and drawings, but is determined by reasonable interpretation of the claims.

What is claimed is:

1. A battery system comprising:

a main switch configured to supply or cut off a voltage of a battery to a load;

a semiconductor pre-charger module comprising a semiconductor switch configured to supply or cut off the voltage of the battery to the load, and a semiconductor switch driver configured to output a pulse signal for driving the semiconductor switch to turn on and off the semiconductor switch and is-connected in parallel with the main switch; and a controller configured to generate a control signal for controlling the main switch and the semiconductor pre-charger module, wherein the semiconductor switch driver of the semiconductor pre-charger module comprises an isolation element configured to electrically isolate the controller and the voltage of the battery, and wherein the controller is configured to:

check that no current flows to diagnose a failure of the semiconductor pre-charger module, and then turn on the semiconductor switch of the semiconductor pre-charger module;

after turning on the semiconductor switch of the semiconductor pre-charger module, check whether the semiconductor pre-charger module has failed by sensing a current of the semiconductor pre-charger module; and when the voltage of the battery satisfies a system specification, turn on the main switch and then turn off the semiconductor switch of the semiconductor pre-charger module.

2. The battery system of claim 1, wherein the semiconductor switch of the semiconductor pre-charger module comprises a metal-oxide-semiconductor (MOS)-controlled thyristor (MCT).

3. The battery system of claim 1, further comprising a direct current (DC)/DC converter configured to supply a voltage generated by lowering the voltage of the battery to the controller.

4. A control method of a battery system including a main switch configured to supply or cut off a voltage of a battery to a load and a semiconductor pre-charger module connected in parallel with the main switch and comprising a semiconductor switch configured to supply or cut off the voltage of the battery to the load according to a control signal, and a semiconductor switch driver configured to receive the control signal and output a pulse signal for driving the semiconductor switch to turn on and off the semiconductor switch, the control method comprising:

checking that no current flows to diagnose a failure of the semiconductor pre-charger module, and then turning on the semiconductor switch of the semiconductor pre-charger module;

after turning on the semiconductor switch of the semiconductor pre-charger module, checking whether the semiconductor pre-charger module has failed by sensing a current of the semiconductor pre-charger module; and when the voltage of the battery satisfies a system specification, turning on the main switch and then turning off the semiconductor switch of the semiconductor pre-charger module.

5. The battery system of claim 1, further comprising a voltage/current sensing unit configured to sense a voltage and a current to diagnose a failure of at least one of the semiconductor pre-charger module and the battery system.

6. The battery system of claim 1, wherein the isolation element of the semiconductor switch driver is an optocoupler.

7. The battery system of claim 6, wherein:

a light-emitting unit of the optocoupler is connected to the controller; and a light receiving unit of the optocoupler is connected to a gate of the semiconductor switch.

8. The battery system of claim 1, wherein the isolation element of the semiconductor switch driver is a transformer in which a primary side and a secondary side are electrically isolated and signal transmission is performed by an electro-magnetic induction action.

9. A semiconductor pre-charger module comprising:

a semiconductor switch configured to supply or cut off a voltage of a battery to a load according to an external control signal; and a semiconductor switch driver configured to output a pulse signal for driving the semiconductor switch to turn on and off the semiconductor switch, wherein the semiconductor switch driver comprises an isolation element configured to electrically isolate the external control signal and the voltage of the battery, and the semiconductor switch is connected in parallel with a main switch capable of supplying the voltage to the load, and wherein the external control signal is configured to:

check that no current flows to diagnose a failure, and then turn on the semiconductor switch;

after turning on the semiconductor switch, check whether the semiconductor pre-charger module has failed by sensing a current of the semiconductor pre-charger module; and when the voltage of the battery satisfies a system specification, turn on the main switch and then turn off the semiconductor switch.

10. The semiconductor pre-charger module of claim 9, wherein the semiconductor switch comprises a metal-oxide-semiconductor (MOS)-controlled thyristor (MCT).

11. The semiconductor pre-charger module of claim 9, further comprising a voltage/current sensing unit configured to sense a voltage and a current to diagnose a failure of the semiconductor pre-charger module.

12. The semiconductor pre-charger module of claim 9, wherein the isolation element of the semiconductor switch driver is an optocoupler.

13. The semiconductor pre-charger module of claim 9, wherein the isolation element of the semiconductor switch driver is a transformer in which a primary side and a secondary side are electrically isolated and thus signal transmission is performed by an electromagnetic induction action.

14. The control method of claim 4, wherein the semiconductor switch of the semiconductor pre-charger module comprises a metal-oxide-semiconductor (MOS)-controlled thyristor (MCT).

* * * * *